United States Patent [19]
Rantasuo et al.

[11] Patent Number: 5,557,326
[45] Date of Patent: Sep. 17, 1996

[54] METHOD AND APPARATUS FOR PRODUCING A FALSE COLOR IMAGE

[75] Inventors: Markku Rantasuo; Tuomas Häme, both of Espoo, Finland

[73] Assignee: Valtion teknillinen tutkimuskeskus, Espoo, Finland

[21] Appl. No.: 244,433

[22] PCT Filed: Nov. 27, 1992

[86] PCT No.: PCT/FI92/00325
§ 371 Date: Jul. 18, 1994
§ 102(e) Date: Jul. 18, 1994

[87] PCT Pub. No.: WO93/11630
PCT Pub. Date: Jun. 10, 1993

[30] Foreign Application Priority Data

Nov. 27, 1991 [FI] Finland ................................... 915597

[51] Int. Cl.$^6$ ................................... H04N 9/04; H04N 5/33
[52] U.S. Cl. .................. 348/272; 348/273; 348/280; 348/166; 348/33
[58] Field of Search ............................ 348/272, 273, 348/280, 164, 166, 29, 33, 34; H04N 5/33, 9/04

[56] References Cited

U.S. PATENT DOCUMENTS 4,170,987  10/1979  Anselmo et al. ..................... 128/665
4,751,571   6/1988  Lillquist ............................... 358/113

FOREIGN PATENT DOCUMENTS 384009   8/1990  European Pat. Off. .
443906   8/1991  European Pat. Off. .
89/12941 12/1989  WIPO .

*Primary Examiner*—Safet Metjahic
*Assistant Examiner*—Sherrie Hsia
*Attorney, Agent, or Firm*—Merchant, Gould, Smith, Edell, Welter & Schmidt, P.A.

[57] ABSTRACT

A method for creating a false color image, by utilizing a video camera provided with two or three arrays of semiconductor detectors, the sensitivity range whereof, in relation to wavelength, extends from the visible light range to near infrared radiation range, and where the radiation received in the semiconductor detectors is filtered. The radiation received in the first array of semiconductor detectors is filtered so that only near infrared radiation is given access to the detector array. Further, the radiation received in the second semiconductor detector array, or alternatively in the second and third semiconductor detector arrays is filtered so that of the radiation of the visible spectrum range, green and red are given access to the detector array or arrays. The signals obtained from the first and second semiconductor detector arrays, or alternatively from the first, second and third semiconductor detector arrays, representing the strength of near infrared radiation and the strength of the radiation of the green and red spectrum ranges, are decoded by changing the order of the signals in order to achieve a desired false color signal in the camera output.

6 Claims, 2 Drawing Sheets

METHOD AND APPARATUS FOR PRODUCING A FALSE COLOR IMAGE

BACKGROUND OF THE INVENTION

1. Field of the Invention

The invention relates to the methods for producing false color images. The invention also relates to apparatuses applying the said methods for producing false color images.

2. Description of the Related Art

Semiconductor video cameras include a number of semiconductor detectors, generally silicon-based detectors, which are arranged in line form or in matrix form. In addition, these detectors are generally coupled as CCD-detectors. Such CCD-detectors are sensitive for both visible light and near infrared radiation, as is illustrated in FIG. 1. In color video cameras based on semiconductors, there are generally two or three arrays of CCD-detectors, the first array whereof is used for detecting blue color B, and the second for detecting combined green G and red R, or alternatively only green color G, in which case red color R is detected by means of the third array. The spectrum ranges of different colors with respect to wavelength are illustrated in FIG. 1.

In ordinary video cameras, the access of near infrared radiation to the detectors is prevented by placing a filter cutting off near infrared radiation in front of the said detectors. The colors of the drawing, i.e. blue, green and red, are separated by means of another set of filters provided in front of the different detector arrays.

From the Finnish patent publication FI 79,641, there is known a method and apparatus for producing a false color image. In the invention described in the said patent publication, the false color image is created so that from two channels, i.e. detector arrays, the effect of near infrared radiation was electrically reduced, whereafter the signals R, G, B representing various colors were coded, and a video image resembling a false color image was created.

A drawback with the known method and apparatus is, that the video signal is electrically processed for several times, which weakens the image quality. Another drawback of the invention is that this kind of electrical arrangement for producing a false color image uses a relatively high amount of electric power, which is an obvious disadvantage for instance while surveying the surroundings with a false color camera from an aeroplane.

SUMMARY OF THE INVENTION

The object of the invention is to introduce a new method for producing false color images, which method makes use of semiconductor cameras known as such. By means of the method and apparatus of the invention; the drawbacks of the known false color imaging method can be avoided, and the scanning can be realized in a remarkably simpler fashion than before. This is achieved by the characteristic features of the invention.

In the first method of the invention, there is utilized a video camera provided with two arrays of semiconductor detectors, the sensitivity range whereof in relation to wavelength extends from the range of visible light to the near infrared range, and where the radiation obtained in the semiconductor detectors is filtered. According to the invention, the radiation obtained in the first semiconductor detector array is filtered so, that only near infrared radiation is given access to the detector array; the radiation obtained in the second semiconductor detector array is filtered so, that among the radiation of the visible spectrum range, green and red light are given access to the detector array; and the signals obtained from the first and second semiconductor detector arrays and representing the strength of near infrared radiation and the strength of the radiation of the green and red spectrum ranges, are decoded by changing the order of the signals in order to achieve the desired combined false color signal in the camera output.

In another method of the invention, there is utilized a video camera provided with three arrays of semiconductor detectors with a sensitivity range in relation to wavelength extends from the range of visible light to the near infrared range, and where the radiation obtained in the semiconductor detectors is filtered. According to the invention, the radiation obtained in the first array of semiconductor detectors is filtered so, that only near infrared radiation is given access to the detector array; the radiation obtained in the second array of semiconductors is filtered so, that of the radiation of the visible spectrum range, green light is given access to the detector array; and the radiation obtained in the third array of semiconductors is filtered so, that of the radiation of the visible spectrum range, red light is given access to the detector array; and the signals obtained from the first, second and third semiconductor detector arrays and representing the strength of near infrared radiation, and the radiation of the green and red spectrum ranges, are decoded by changing the order of the signals in order to create a desired combined false color signal in the camera output.

In a preferred embodiment of the method, the signals representing the strength of the near infrared, green and red spectrum range radiations, are decoded by arranging them in the order green, red and infrared signal in the video camera output.

In another preferred embodiment of the method, the signals representing the strength of the near infrared radiation are decoded by arranging them in the reversed order green and infrared signal, whereas the signal representing the radiation of the red spectrum range remains as such in the video camera output.

An advantage of the invention is that a false color video image is produced by means of optical filtering inside the video camera. Thus the solution is simple, and the image quality is maintained good. Another advantage of the invention is that the video camera of the invention does not require additional electrical components. Thus the power consumption of the camera remains on the same level as that of an ordinary video camera.

BRIEF DESCRIPTION OF THE DRAWINGS

The invention is explained in more detail below, with reference to the appended drawings, where.

DETAILED DESCRIPTION OF THE PREFERRED EMBODIMENT

Figure 1:
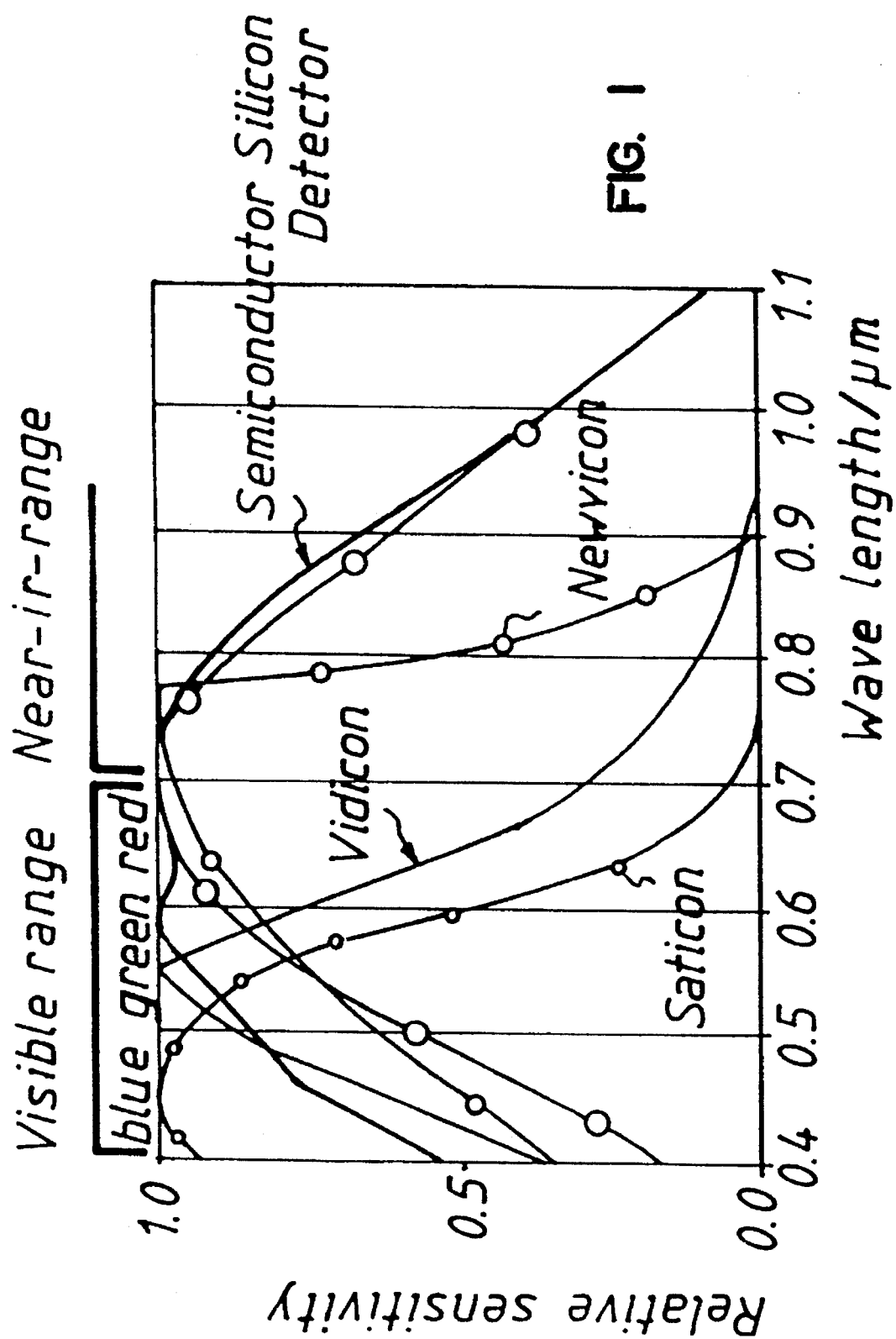
FIG. 1 illustrates the sensitivity range of a CCD-detector generally used in semiconductor video cameras.
Figure 2:
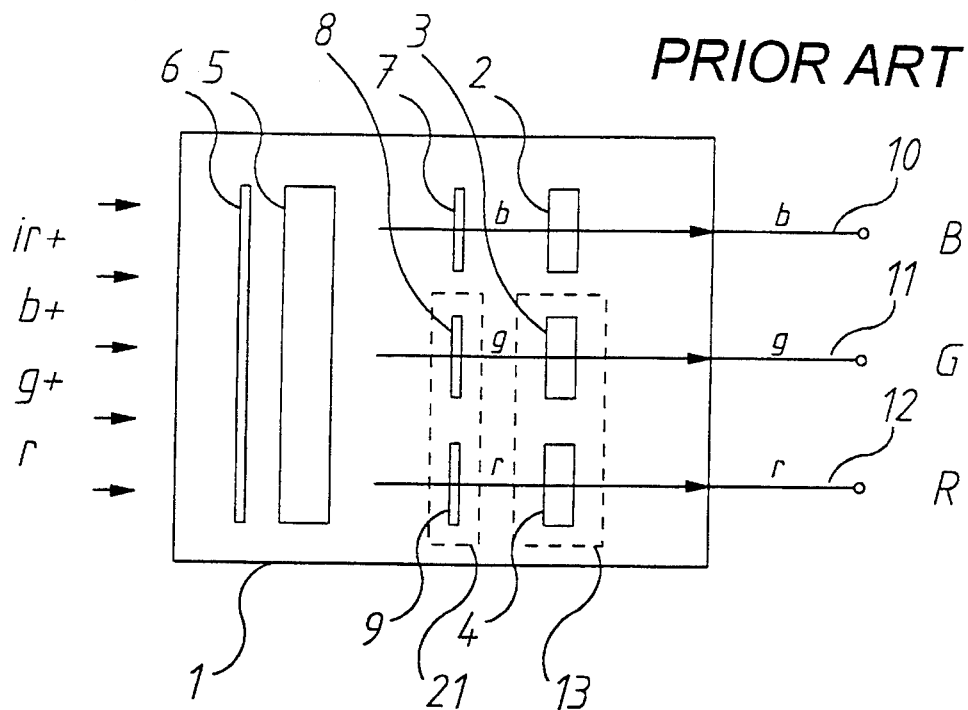
FIG. 2 is a schematic illustration of an ordinary video camera.

The ordinary video camera 1 of FIG. 2 comprises three detector arrays 2, 3 and 4, an optical system 5 as well as the infrared radiation filter 6 and color separation filters 7, 8 and 9. The infrared radiation filter 6 prevents the near infrared radiation contained in the incoming radiation from entering the detector arrays via the optical system 5. The color separation filters 7, 8 and 9 in turn are used for separating the blue spectrum range onto the first detector 2, the second color separation filter 8 is used for separating the green spectrum range onto the second detector array 3, and the third color separation filter 9 is used for separating the red spectrum range onto the third detector array 4. The detector arrays 2, 3 and 4 are connected in the output channels 10, 11 and 12 of the camera, through which channels there are obtained the corresponding color signals B, G, R, i.e. signals representing the blue, green and red spectrum ranges.

The detector arrays 2, 3 and 4 of an ordinary video camera can also be grouped so that the detector arrays 3, 4 together form a combined detector array 13 (marked with dotted lines in FIG. 2). Respectively, in front of this detector array 13, there is provided a filter 14 (dotted lines again), which is permeable to the radiation of the green and red spectrum ranges. The green G and red R color signal are separated from each other at later stages by using known technique.

Figure 3:
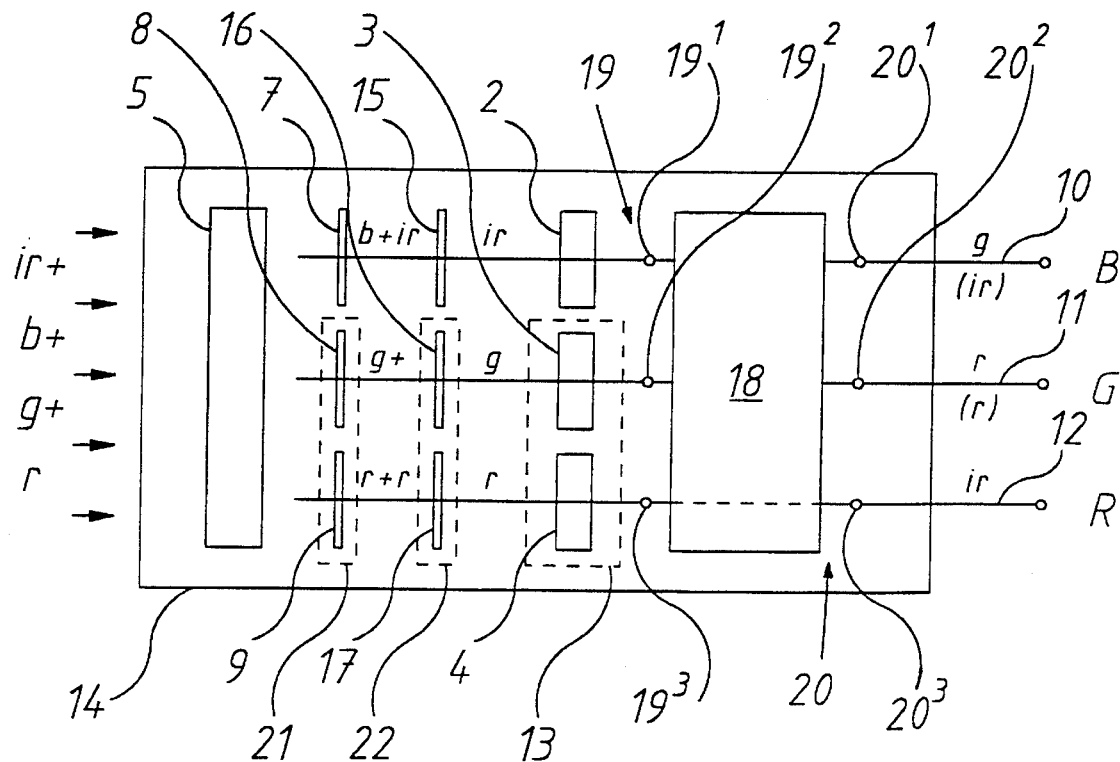
FIG. 3 is a schematic illustration of an apparatus of the invention for producing a live false color image.

The apparatus of the invention for creating a false color image is illustrated in FIG. 3. The apparatus comprises a video camera provided with three arrays of semiconductor detectors 2, 3 and 4, in similar fashion as in the ordinary video camera of FIG. 2. The apparatus also included an optical system 5 and color separation filters 7, 8 and 9, which are respectively arranged in connection with the detector arrays 2, 3 and 4. By means of the filter 7, radiation of the green and red spectrum ranges, belonging to the visible wavelength range, is prevented from proceeding to the first detector array 2. By means of the filter 8, the radiation of the blue and red spectrum ranges is prevented from proceeding to the second detector array 3. By means of the filter 9, the radiation of the blue and green spectrum ranges is prevented from proceeding to the third detector array 4. However, near infrared radiation ir has free access through all filters 7, 8 and 9. By means of the optical system 5, the radiation entering the apparatus, i.e. the image, is divided into three sub-images which are directed to the detector arrays 2, 3 and 4.

In front of each detector array 2, 3 and 4 of the apparatus, there are arranged extra filters 15, 16 and 17 respectively. The first filter 15 in front of the first detector array 2 attenuates the wavelengths of the blue spectrum range b. In front of the second and third detector arrays 2, 3, there are arranged respective filters 16, 17 for attenuating near infrared radiation ir. From the first semiconductor detector array 2, there is thus received a signal representing the proportion of near infrared radiation ir in the video image; from the second semiconductor detector array 3 there is received a signal representing the proportion of the green spectrum range g in the video image; and from the third semiconductor detector array 4, there is received a signal representing the proportion of the red spectrum range r in the video image. At this stage the said signals ir, g, r are in the above described order in relation to the output channels 10, 11 and 12 or B, G and R respectively, of an ordinary video camera. Now, however, these signals are fed into the a decoder 18, whereby the order of the signals in the output channels 10, 11, 12 of the camera is changed. To the input poles $19^1$, $19^2$, $19^3$ of the decoder 18, there are respectively fed the signals ir, g and r. The input poles $19^1$, $19^2$, $19^3$ of the decoder 18 are coupled to output poles $20^1$, $20^2$, $20^3$ so that the input pole $19^1$ is coupled to the output pole $20^1$ and the input poles $19^2$ and $19^3$ to the output poles $20^2$ and $20^3$ respectively. Thus the signals in the output poles 10, 11 and 12 of the camera are in respective order g, r and ir, i.e. they correspond to the signal outputs B, G and R of an ordinary video camera.

In the apparatus of FIG. 3, two detector arrays can be employed, i.e. the first detector array 2 and another detector array 13 combined of the detector arrays 3 and 4, in similar fashion as in the video camera of FIG. 2. Further, instead of the color separation filters 8, 9, there is advantageously used a combined color separation filter 21. In corresponding fashion, in front of the combined detector array 13, there also is provided a combined extra filter 22. This extra filter 22 is a near infrared radiation filter, and corresponds to the single extra filter 16 or 17. The combined signal g+r, received from the combined detector array 13, representing the combined signal of green and red spectrum ranges, is fed into the decoder 18 via the combined input pole $19^2$, $19^3$, so that it is respectively obtained from the decoder via the combined output pole $20^1$, $20^2$ to the combined output channel 10, 11 of the video camera, to be further processed in normal fashion. Consequently, from the combined output channel 10, 11 there is received the signal g+r, which corresponds to the output signal B+G obtained from an ordinary video camera.

The order of the signals in the output of an apparatus of the invention can also be changed, by using the decoder 18, in another fashion than the one described above. In that case the input poles $19^1$, $19^2$ are coupled to the output poles $20^2$, $20^1$ respectively, whereas the input pole $19^3$ is respectively coupled to the output pole $20^3$. This is illustrated with dotted lines in FIG. 3. Now the signals in the output poles 10, 11 and 12 of the camera are in respective order g, ir, r, i.e. they correspond to the outputs B, G, R of an ordinary video camera. An alternative type of false color information is produced by means of this arrangement.

In the above specification, the invention is described mainly with reference to one preferred embodiment, but it is clear that the invention can be modified in many ways within the scope of the inventional idea defined in the appended patent claims.

We claim:

1. A method for producing a false color image, using a video camera provided with first and second arrays of semiconductor detectors, the first and second arrays having a sensitivity range in relation to wavelength extending from visible light to near infrared radiation; and where radiation received in the first and second arrays is filtered, the method comprising:

filtering the radiation received in the first array to provide that only the near infrared radiation (ir) is given access to the first array;

filtering the radiation received in the second array to provide that only the radiation of green (g) and red (r) spectrum ranges are given access to the second array; and decoding signals (ir, g+r) received from the first and second arrays representing strength of the near infrared radiation (ir) and strength of the radiation of the green (g) and red (r) spectrum ranges, by changing order of the signals to achieve a desired combined false color signal (g+r, ir) in a camera output.

2. A method for producing a false color image, utilizing a video camera provided with first, second, and third arrays of semiconductor detectors, the first, second, and third arrays having a sensitivity range in relation to wavelength extending from visible light to near infrared radiation; and where radiation received in the first, second, and third arrays is filtered, the method including the steps of:

filtering the radiation received in the first array to provide that only the near infrared radiation (ir) is given access to the first array;

filtering the radiation received in the second array to provide that only the radiation of green (g) spectrum range is given access to the second array;

filtering the radiation received in the third array to provide that only the radiation of red (r) spectrum range is given access to the third array;

decoding signals (ir, g, r) received from the first, second and third arrays representing strength of the near infrared radiation (ir) and strength of the radiation of the green (g) and red (r) spectrum ranges, by changing order of the signals to achieve a desired combined false color signal (g, r, ir) in a camera output.

3. The method of claim 2 for producing a false color image, wherein the decoding step includes rearranging the signals representing the strength of the near infrared radiation and the radiation from the green (g) and red (r) spectrum ranges into an order green (g), red (r) and infrared (ir) in the camera output.

4. The method of claim 2 for producing a false color image, wherein the decoding step includes rearranging the signals representing the strength of radiation of the green (g) spectrum range and the near infrared radiation (ir) in reversed order into green (g) and near infrared (ir), whereas the signal representing the radiation of the red (r) spectrum range is maintained in the camera output.

5. An apparatus for producing a false color image, comprising:

a video camera provided with first and second arrays of semiconductor detectors and a first color separation filter system, the first and second arrays having a sensitivity range in relation to wavelength extending from visible light to near infrared radiation;

a decoder; and a second filter system including,
a first filter for attenuating wavelengths of blue light (b), the first filter being arranged in cooperation with the first array of semiconductor detectors to provide that received radiation is filtered so that only the near infrared radiation (ir) is given access to the first array;
a second filter for attenuating the near infrared radiation (ir), the second filter being arranged in cooperation with the second array of semiconductor detectors to provide that received radiation is filtered so that only the radiation of red (r) and green (g) spectrum ranges are given access to the second array; and that signals (ir, g+r) obtained from the first and second arrays and representing strength of the near infrared radiation (ir) and strength of the radiation of the green (g) and red (r) spectrum ranges, are decoded in the decoder by changing an order of the signals to achieve a desired combined false color signal (g+r, ir) in an output of the camera.

6. An apparatus for creating a false color image, comprising:

a video camera and a first color separation filter system, the video camera including first, second, and third arrays of semiconductor detectors;

a decoder; and a second filter system including,
a first filter attenuating wavelengths of blue light (b), the first filter being arranged to cooperate with the first array to provide that received radiation is filtered so that only near infrared radiation (ir) is given access to the first array;
a second filter attenuating the near infrared radiation (ir), the second filter being arranged to cooperate with the second array to provide that received radiation is filtered so that only the radiation of green (g) spectrum range is given access to the second array;
a third filter (17) attenuating the near infrared radiation (ir), the third filter being arranged to cooperate with the third array to provide that received radiation is filtered so that only the radiation of red (r) spectrum range is given access to the third array;
wherein signals (ir, g, r) obtained from the first, second and third arrays and representing strength of the near infrared radiation (ir) and strength of the green (g) and red (r) radiation, are decoded in the decoder by changing an order of the signals to achieve a desired combined false color signal (g, r, ir; g, ir, r) in an output of the camera.

* * * * *